United States Patent
Matsukuma et al.

(10) Patent No.: US 7,950,710 B2
(45) Date of Patent: May 31, 2011

(54) ROBOT

(75) Inventors: Kenji Matsukuma, Fukuoka (JP);
Takayuki Nakamura, Fukuoka (JP);
Kazuhiko Yokoyama, Fukuoka (JP);
Kazuhiro Fukudome, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/562,081

(22) Filed: Sep. 17, 2009

(65) Prior Publication Data
US 2010/0010670 A1    Jan. 14, 2010

Related U.S. Application Data

(63) Continuation of application No. PCT/JP2008/055635, filed on Mar. 26, 2008.

(30) Foreign Application Priority Data

Apr. 3, 2007 (JP) ................................ 2007-097255

(51) Int. Cl.
*B25J 15/10* (2006.01)
(52) U.S. Cl. .......... 294/104; 294/106; 700/245; 901/28; 901/38; 901/39; 414/4; 623/57
(58) Field of Classification Search .................... 901/28, 901/29, 36, 30, 31, 38, 39; 74/490.05, 490.06; 99/468; 601/1; 345/156, 179; 463/38; 606/1; 128/898; 700/245; 294/104, 103.1, 103.2, 294/1.6; 414/4; 623/57
See application file for complete search history.

(56) References Cited

U.S. PATENT DOCUMENTS

| | | | | |
|---|---|---|---|---|
| 5,351,602 A * | 10/1994 | Monroe | ............................ | 92/64 |
| 5,792,483 A * | 8/1998 | Siegrist et al. | ................ | 425/135 |
| 6,244,644 B1 * | 6/2001 | Lovchik et al. | ............... | 294/111 |
| 6,247,738 B1 * | 6/2001 | Winkel et al. | .................. | 294/111 |
| 6,786,896 B1 * | 9/2004 | Madhani et al. | .................. | 606/1 |
| 7,411,576 B2 * | 8/2008 | Massie et al. | ................. | 345/156 |
| 7,472,047 B2 * | 12/2008 | Kramer et al. | .................... | 703/6 |
| 7,555,969 B2 * | 7/2009 | Okazaki | ..................... | 74/490.05 |
| 2001/0028174 A1* | 10/2001 | Matsuda et al. | ............. | 294/106 |
| 2004/0054424 A1* | 3/2004 | Matsuda | ......................... | 623/64 |
| 2005/0006915 A1* | 1/2005 | Matsuda | ...................... | 294/99.1 |
| 2005/0043718 A1* | 2/2005 | Madhani et al. | .................. | 606/1 |
| 2005/0102037 A1* | 5/2005 | Matsuda | ......................... | 623/24 |
| 2005/0193901 A1* | 9/2005 | Buehler | ........................ | 99/468 |
| 2006/0167564 A1* | 7/2006 | Flaherty et al. | ................. | 623/57 |
| 2007/0152619 A1* | 7/2007 | Sugiyama et al. | ........ | 318/568.12 |

FOREIGN PATENT DOCUMENTS

| | | |
|---|---|---|
| JP | 2003-117873 | 4/2003 |
| JP | 2005-088147 | 4/2005 |
| JP | 2005-335010 | 12/2005 |
| JP | 2006-116667 | 5/2006 |
| WO | WO 2006/080088 | 8/2006 |

* cited by examiner

*Primary Examiner* — Ronnie Mancho
(74) *Attorney, Agent, or Firm* — Ditthavong Mori & Steiner, P.C.

(57) ABSTRACT

A robot includes a base unit, at least two link mechanisms arranged on the base unit, drive units capable of bending and expanding the link mechanisms, and a control unit controlling the drive units. At least one drive unit has a drive force larger than those of the other drive units, and the other drive units are passively displaced by external forces larger than their own drive forces.

20 Claims, 14 Drawing Sheets

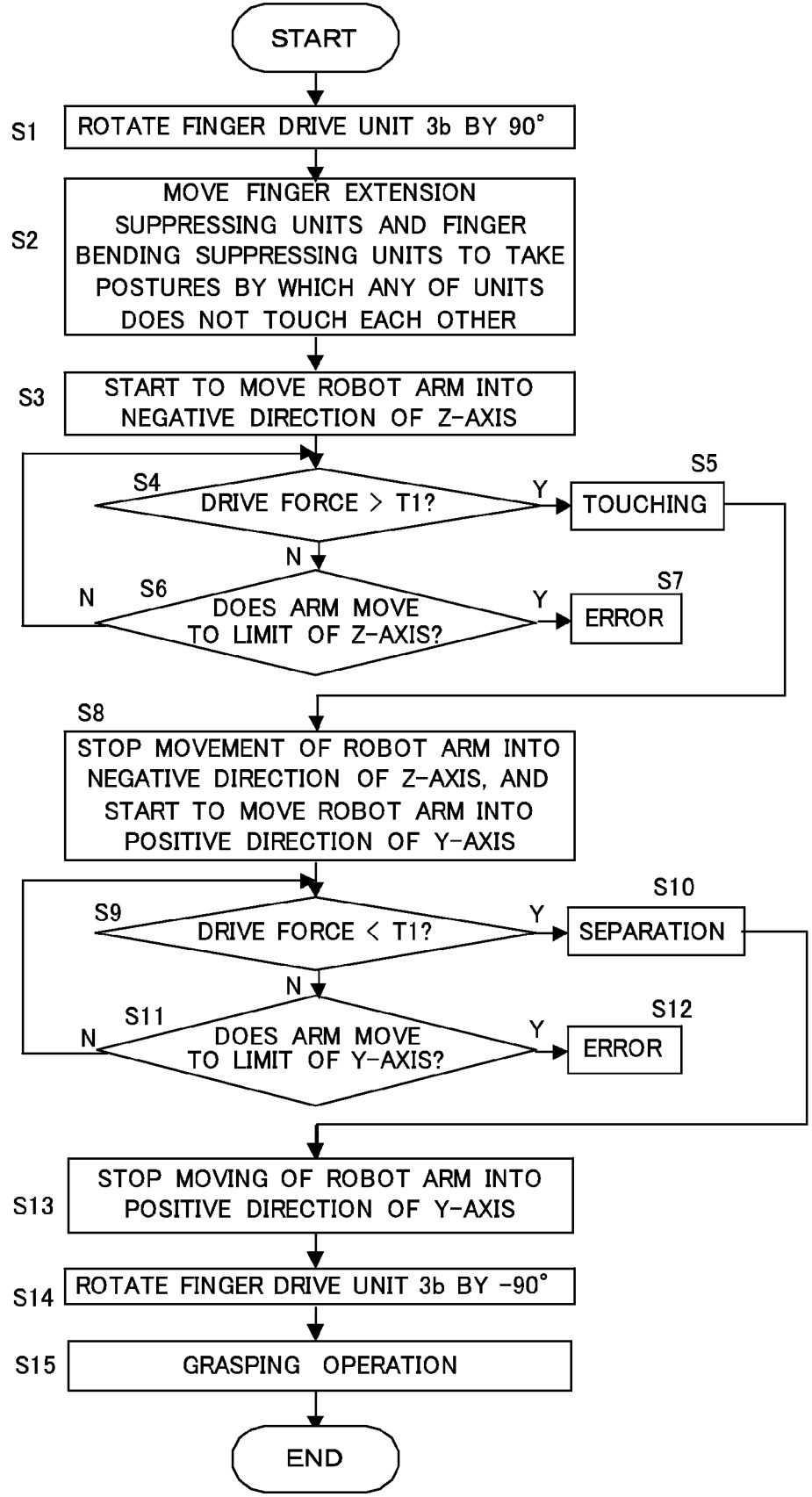

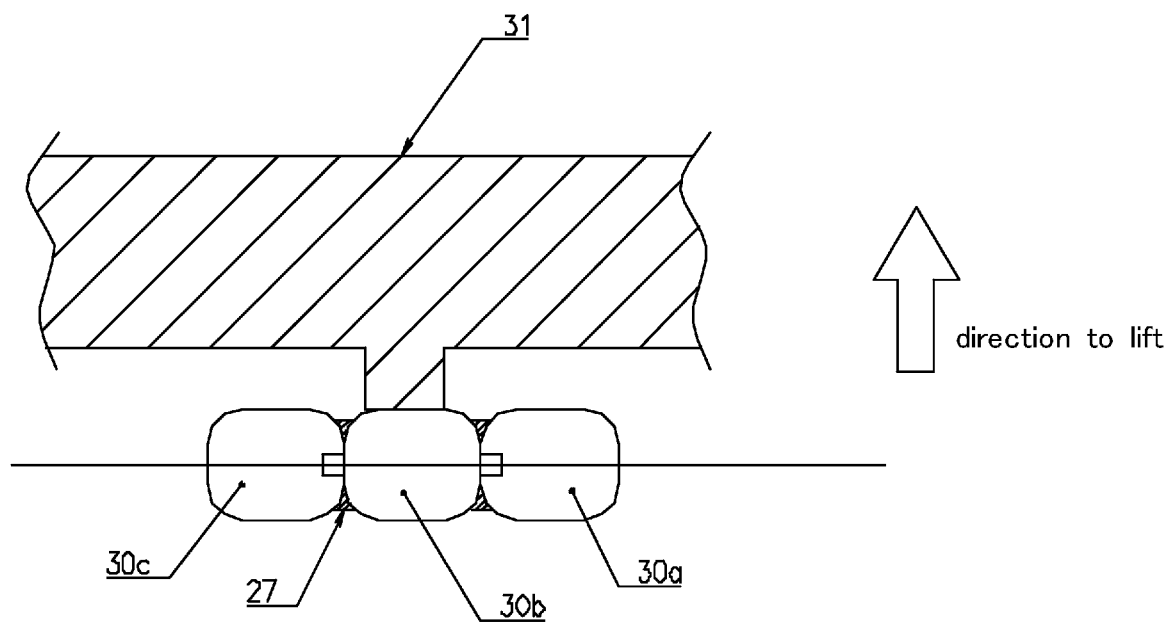

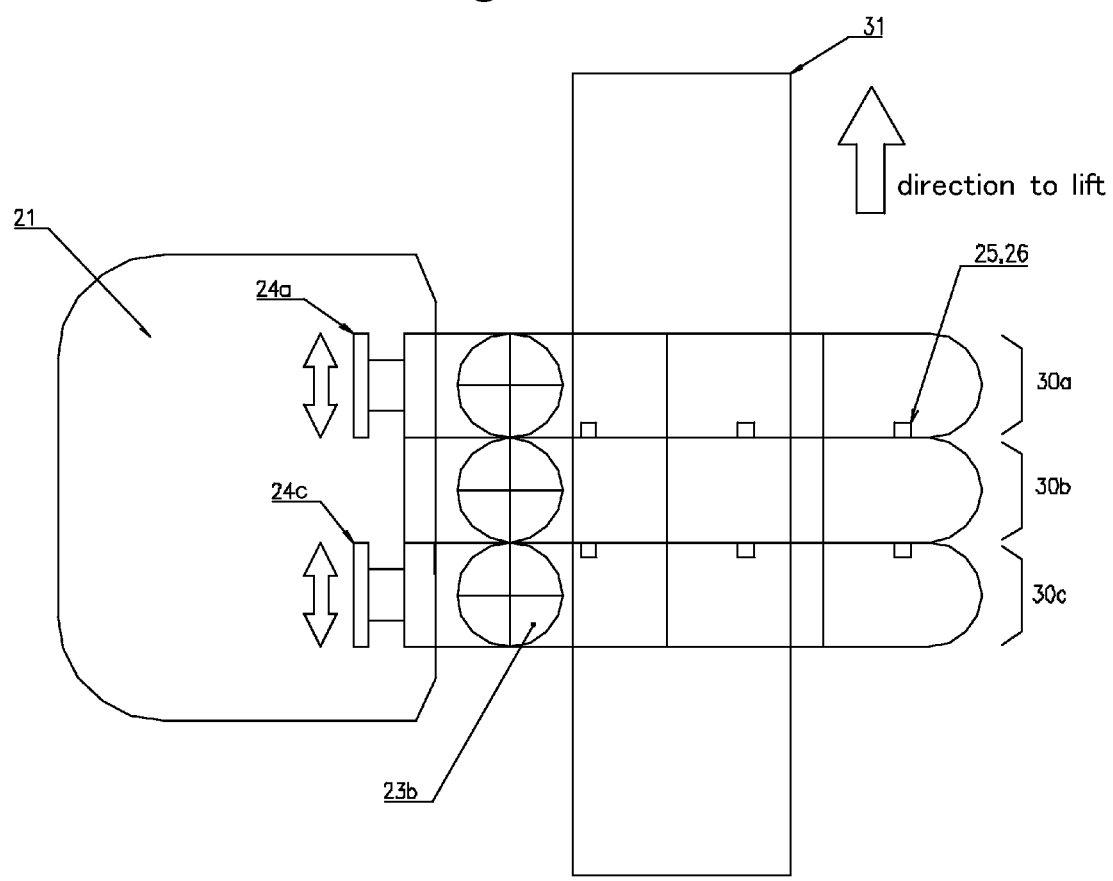

ROBOT

CROSS-REFERENCE TO RELATED APPLICATIONS

The present application is a continuation application of PCT/JP2008/055635, filed Mar. 26, 2008, which claims priority to Japanese Patent Application No. 2007-097255, filed Apr. 3, 2007. The contents of these applications are incorporated herein by reference in their entirety.

BACKGROUND OF THE INVENTION

1. Field of the Invention

The present invention relates to a robot capable of dealing with a heavily-loaded load despite its small shape and capable of realizing various patterns of manipulation operations with a high degree of accuracy.

2. Discussion of the Background

An industrial robot is furnished with a hand device for performing various kinds of work, and a gripper type hand device has been widely used as the hand device. As the configuration of the gripper type hand device, for example, the configuration of swingably supporting a pair of flat plates with one shaft or parallel two shafts to make the flat plates perform opening and closing operations is given. The gripper type hand device generally has high strength to be able to deal with a heavy load. Consequently, the gripper type hand device obtains a high evaluation in terms of the reliability thereof, combined with the simple configuration thereof. However, since the gripper type hand device has the simple configuration, the gripper type hand device has a disadvantage of being inferior in the applicability to the work treating various goods.

Accordingly, the configuration of having a multi-fingered multi-jointed structure similarly to a human being and arranging motors directly to finger joints for the purpose of manipulating small-sized light parts skillfully is proposed in FIGS. 5 and 6 of Japanese Patent Application Laid-Open No. 2005-335010. According to the configuration, because the mechanism thereof is simple in addition to the capability of using the outputs of the motors as joint torque directly, the maintenance thereof, such as the exchange of the motors, is also easy.

SUMMARY OF THE INVENTION

According to one aspect of the present invention, a robot comprises: a base unit; at least two link mechanisms arranged on the base unit; drive units capable of bending and extending the link mechanisms; and a control unit controlling the drive units, wherein at least one of the drive units has a drive force larger than those of the other drive units, and the other drive units are passively displaced by an external force larger than their own drive forces, wherein the robot further comprises extension suppressing units suppressing displacement of the other drive units in directions of their extensions at predetermined positions.

According to another aspect of the present invention, a control method of a robot including a base unit and at least two link mechanisms arranged on the base unit enables the link mechanism to be bent and extended with the drive units and controls the drive units with a control unit, wherein the control unit controls the drive units lest adjacent ones of the extension suppressing units should touch each other when a manipulation object is a small-sized light load, and controls the drive units so that the adjacent ones of the extension suppressing units touch each other when the manipulation object is a large-sized heavy load.

According to another aspect of the present invention, a robot comprises: a base unit; at least two link mechanisms arranged on the base unit; drive units capable of bending and extending the link mechanisms; and a control unit controlling the drive units, wherein the drive units having drive forces larger than those of the drive units capable of bending and extending the link mechanisms are arranged on the base unit, and the drive units arranged on the base unit transmit power to the link mechanisms with a power transmitting mechanism.

According to further aspect of the present invention, a control method of a robot including a base unit and at least two link mechanisms arranged on the base unit enables the link mechanisms to be bent and extended with the drive units and controls the drive units with a control unit, wherein a superior control apparatus outputting an instruction to the control unit obtains information of outside dimensions, weight, and the like of an object, in advance by image recognition or detection means, such as an identification tag, and informs the control unit of the information, wherein the control unit controls the drive units by a driving operation according to the information.

According to another aspect of the present invention, a robot comprises: a base unit; at least two link mechanisms arranged on the base unit; drive units capable of bending and extending the link mechanisms; and a control unit controlling the drive units, wherein adjacent ones of the link mechanisms are joined to each other.

According to another aspect of the present invention, a control method of a robot including a base unit and at least two link mechanisms arranged on the base unit enables the link mechanisms to be bent and extended with the drive units and controls the drive units with a control unit, wherein the link mechanisms perform synchronous operations by a cooperative control when the link mechanisms operates in a state of being joined to each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a control flow chart of a finger control unit in the hand device of the present invention;

FIG. 12 is a sectional view showing a working state of a hand device of the present invention;

FIG. 14 is a side view showing a working sate of the hand device of the present invention.

DESCRIPTION OF THE EMBODIMENTS

Figure 1:
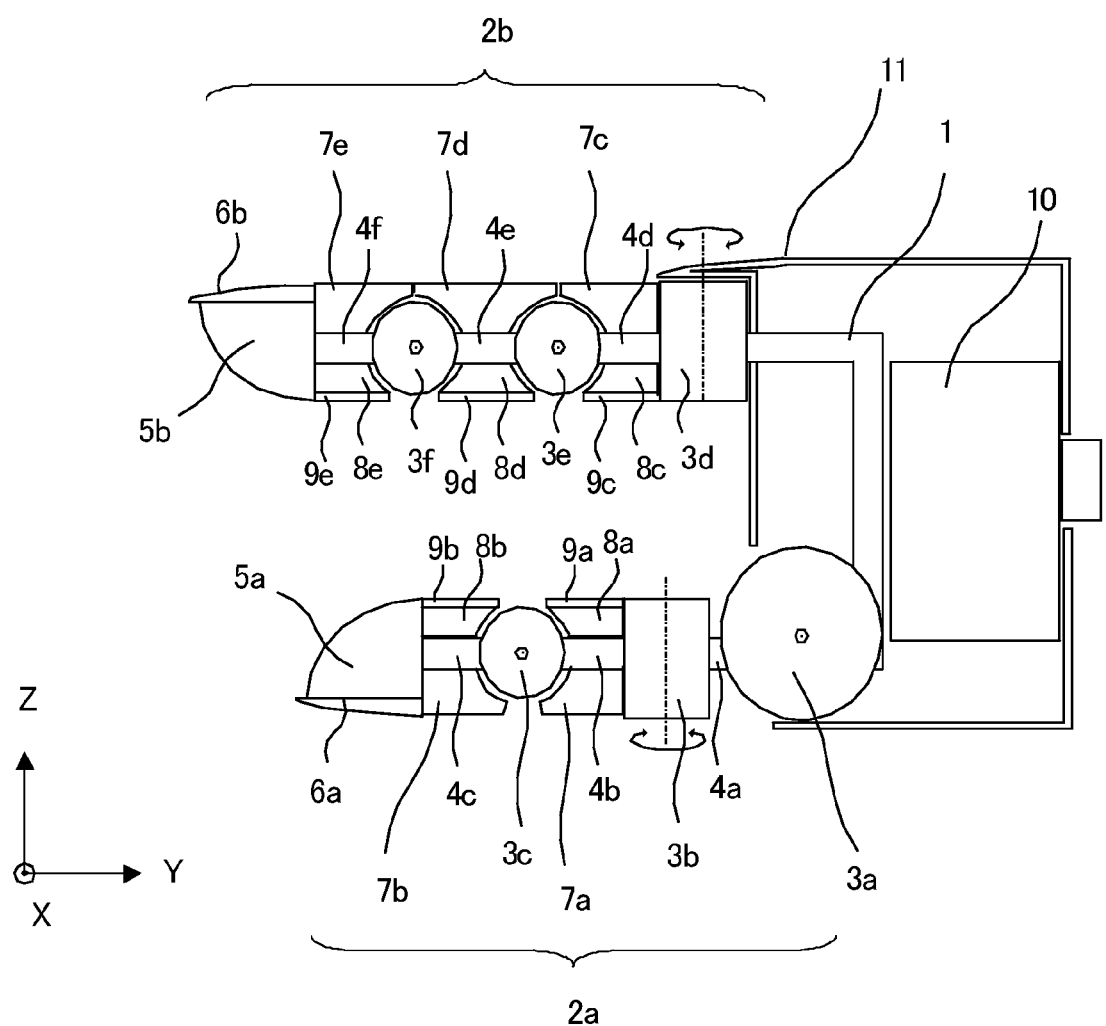
FIG. 1 is a side view of a hand device showing a first embodiment of the present invention.

Embodiments will now be described with reference to the accompanying drawings, wherein like reference numerals designate corresponding or identical elements throughout the various drawings.

In the following, exemplary embodiments of the present invention will be described with reference to the attached drawings. Incidentally, the examples of the applications of the present invention to the hand devices of robots will be described as the best modes for implementing the invention in the subsequent embodiments.

Embodiments 1

FIG. 1 is a side view showing the configuration of a hand device of the present invention. In FIG. 1, a reference numeral 1 denotes a hand base unit, and reference numerals 2a and 2b denote finger units arranged on the hand base unit 1. The finger unit 2a corresponds to a thumb of a human being, and the finger unit 2b corresponds to a forefinger of a human being. Both the finger units 2a and 2b are almost opposed. The finger unit 2a is configured to join finger drive units 3a, 3b, and 3c to each other with links 4a, 4b, and 4c, respectively. A finger tip portion 5a is attached to the end of the link 4c, and further a nail portion 6a is attached onto the outer surface of the finger tip portion 5a. The finger unit 2b is configured to join finger drive units 3d, 3e, and 3f with links 4d, 4e, and 4f, respectively. A finger tip portion 5b is attached to the end of the link 4f, and further a nail portion 6b is attached onto the outer surface of the finger tip portion 5b. The finger drive units 3a, 3c, 3e, and 3f among the finger drive units 3a-3f have rotation axes in the X-axis direction in FIG. 1, and the operations of the finger units 2a and 2b in bending and extending directions are thereby enabled. On the other hand, the finger drive units 3b and 3d have rotation axes in the Z-axis direction of FIG. 1, and the operations of the finger units 2a and 2b in the directions of opening and closing in a letter V are thereby enabled. A large-sized actuator having a large drive force (e.g., the output of about 20 W) is used only as the finger drive unit 3a among the finger drive units 3a-3f. Small-sized actuators having small drive forces (e.g., output of about 1 W) are used as the other finger drive units 3b-3f. Moreover, speed reducers having comparatively small speed ratios (e.g., centesimal or less) are used as the finger drive units 3b-3f, and the finger drive units 3b-3f can be rotated from their output sides. That is, the finger drive units 3b-3f are passively displaced to external forces larger than their own drive forces.

Finger extension suppressing units 7a, 7b, 7c, 7d, and 7e are attached to the links 4b-4f, respectively, on the side on which the finger units 2a and 2b extend. The finger extension suppressing units 7a-7e are also used as the external appearance covers of the finger units 2a and 2b, and the finger extension suppressing units 7a-7e touch adjacent finger extension suppressing units 7a-7e to suppress the rotations of the finger drive units 3c, 3e, and 3f in the extension directions. For example, by the touching of the finger extension suppressing units 7c and 7d to each other, the rotation of the finger drive unit 3e into the extension direction thereof is prevented. That is, even if an external force urging the finger unit 2b to extend it further from the position where the finger extension suppressing units 7c and 7d touch each other works on the finger unit 2b, the finger extension suppressing units 7c and 7d receive the external force, and consequently the finger drive unit 3e does not rotate. Finger bending suppressing units 8a, 8b, 8c, 8d, and 8e are attached to the links 4b-4f, respectively, on the side on which the finger units 2a and 2b bend. The finger bending suppressing units 8a-8e are also used as external appearance covers of the finger units 2a and 2b, and suppress the rotations of the finger drive units 3c, 3e, and 3f into the bending directions of the finger units 2a and 2b by touching the adjacent finger bending suppressing units 8a-8e. Moreover, soft members 9a, 9b, 9c, 9d, and 9e are attached onto the outer surfaces of the finger bending suppressing units 8a-8e, respectively. The soft members 9a-9e fill the roles of slip resistance and impact absorption. A reference numeral 10 denotes a finger control unit controlling the finger drive units 3a-3f, and the finger control unit 10 is connected to the finger drive units 3a-3f with not shown wiring. A reference numeral 11 denotes a palm portion cover covering the hand base unit 1, the finger drive unit 3a, and the finger control unit 10. The finger control unit 10 controls at least one of the positions, speeds and torque of the finger drive units 3a-3f on the basis of instructions from not shown superior control apparatus. The superior control apparatus obtains the information of the outside dimensions, the weight, and the like, of an object by image recognition or detection means, such as an identification tag, in advance, and informs the finger control unit 10 of the information. Moreover, also the state of the hand device, such as the switching between a teaching mode and an operation mode, a processing instruction to the occurrence of anything unusual from the finger control unit 10, and the like, are informed between the superior control apparatus and the finger control unit 10.

The respects of the present invention different from those of the related art are that at least one finger drive unit has a drive force larger than those of the other finger drive units, that the other finger drive units are passively displaced by an external force larger than their own drive forces, and that the present invention is provided with extension suppressing units suppressing displacement of the finger drive units in directions of their extensions at predetermined positions.

According to the present invention, the load of a heavy load can be received by the finger extension suppressing unit, and consequently stable manipulations can be realized without imposing any impossible loads on the finger drive units.

Figure 2:
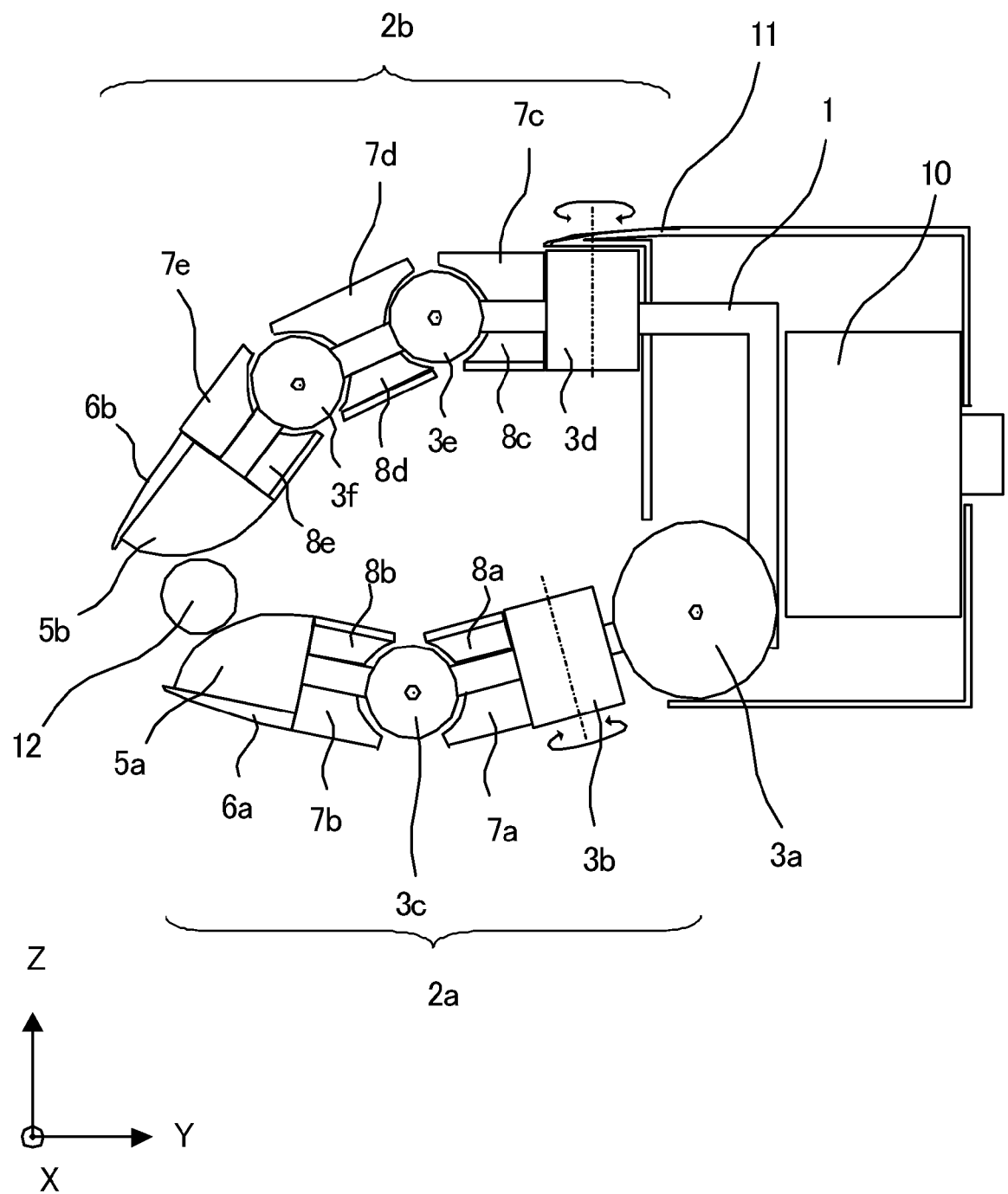
FIG. 2 is a side view showing a state in which the hand device of the present invention grasps a small-sized light part.

FIG. 2 is a side view showing the state in which the hand device of the present embodiment grasps a small-sized light part, such as a screw. In the case where an object 12 is a small-sized light load, the finger units 2a and 2b perform a grasping operation in the relation of being almost opposed to each other. The finger control unit 10 instructs the target rotation angles of the finger drive units 3b-3f so that the hand device grasps the small-sized light part on the basis of the information of the object 12, such as the outside dimensions thereof and the weight thereof, which information has been obtained in advance by a superior control apparatus with image recognition and detection means, such as an identification tag. At this time, the finger control unit 10 controls the finger drive units 3a-3f so that the finger extension suppressing units 7a-7e and the finger bending suppressing units 8a-8e keep angular ranges within which none of them touch the other units. Thereby, a grasping operation having a high degree of freedom can be realized by making the most of the degree of joint freedom of the hand device at a maximum, for example, by adjusting the posture of a finger tip delicately according to the position of the object. Incidentally, by using a soft member, such as rubber, on each of the surfaces of the finger tip portions 5a and 5b, it becomes possible to pick the object 12 stably without damaging the object 12 and making the object 12 slip down. Furthermore, if the object 12 is a small object, a picking operation using the nail portions 6a and 6b can be executed.

Figure 3:
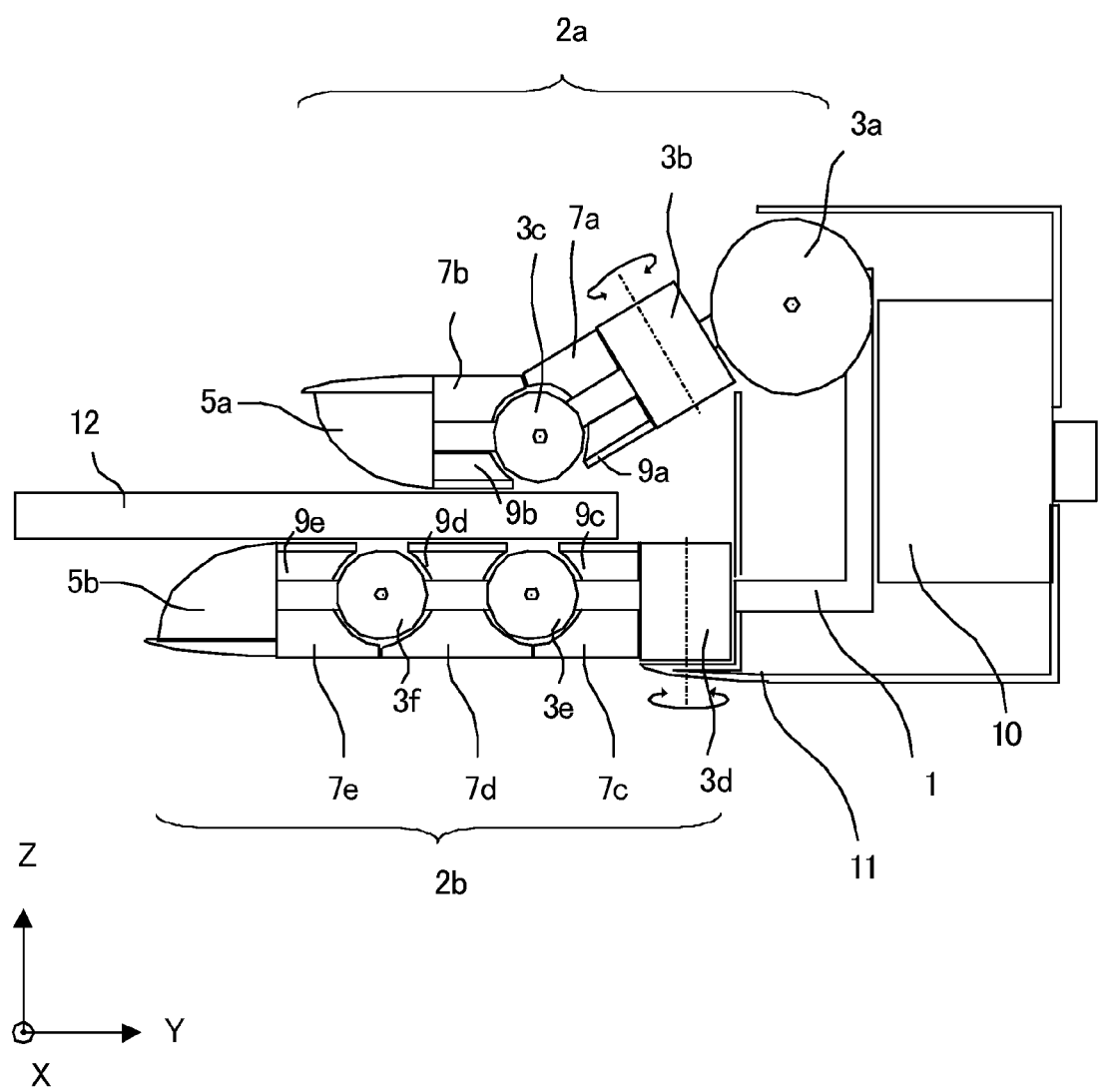
FIG. 3 is a side view showing a state in which the hand device of the present invention grasps a large-sized heavy part.

FIG. 3 is a side view of a state in which the hand device of the present embodiment grasps a large-sized heavy part, such as a steel sheet. The hand device inverts its wrist with a not shown robot arm to position the finger unit 2a on the upside and the finger unit 2b on the downside on the basis of the information of the object 12, such as the outside dimensions thereof and the weight thereof, which information has been obtained in advance by a superior control apparatus with image recognition and detection means, such as an identification tag. The finger control unit 10 controls the finger drive unit 3c to rotate it so that the finger extension suppressing units 7a and 7b touch each other, and controls the finger drive unit 3e to rotate it so that the finger extension suppressing units 7c and 7d touch each other, and further controls the finger drive unit 3f to rotate it so that the finger extension suppressing units 7d and 7e touch each other. Then, the finger control unit 10 controls the finger drive unit 3a to grasp the object 12 so as to put the object 12 between the finger units 2a and 2b. Because the load of the object 12 is received by the finger extension suppressing units 7a-7e and the finger drive unit 3a, the finger drive units 3c, 3e, and 3f are not required to output the torque for grasping the object 12. Incidentally, although forces and moments are imposed on the finger drive units 3b and 3d into the directions other than their rotation directions, it is possible to avoid the forces and moments by the provision of the touching mechanism to the covers. For example, the palm portion cover 11 and the finger drive unit 3d touch each other, and the palm portion cover 11 receives the force and moment imposed on the finger unit 2b in the extension direction thereof to prevent an excessive load from being imposed on the finger drive unit 3d. Moreover, although the control of performing a grasping operation after touching the finger extension suppressing units 7a-7e to each other is performed in the embodiment described above, the similar advantages can be obtained by grasping the object 12 directly without performing the preparation operations of making the finger extension suppressing units 7a-7e touch each other. That is, external forces are imposed on the finger drive units 3c, 3e, and 3f in their extension directions from their output shaft sides in the process of the operation of the finger drive unit 3a to put the object 12 between the finger units 2a and 2b. If the external forces exceed the drive forces of the finger drive units 3c, 3e, and 3f, then the finger drive units 3c, 3e, and 3f are passively displaced into the directions of the external forces. Consequently, the finger drive units 3c, 3e, and 3f operate to the positions where the finger extension suppressing units 7a-7e touch each other.

Incidentally, the grasping of the heavy load has been described here by exemplifying the flat plate steel sheet, but it is possible to surely grasp a heavy load by grasping the heavy load so that the relations of the finger extension suppressing units 7a-7e of the finger units 2a and 2b to be touched with adjacent ones are held even if the heavy load is a spherical or cylindrical body.

By the configuration described above, the load of a heavy load can be received by the finger extension suppressing units 7a-7e, stable grasping can be realized without imposing any impossible loads on the finger drive units 3a-3f. Moreover, by using the finger extension suppressing units 7a-7e also as the external appearance covers, the number of parts can be suppressed to be small, and the cost of the hand device can be reduced. Moreover, by arranging the finger drive unit 3a having a larger drive force at the root of the thumb, the finger drive unit 3a can be housed inside the palm portion cover 11, and consequently a design resembling that of a human palm part and giving no sense of discomfort can be realized. Moreover, by switching a grasping method to a small-sized light load and a large-sized heavy load, a highly versatile hand device capable of coping with both of performing fine work and conveying a large weight can be provided.

Figure 4:
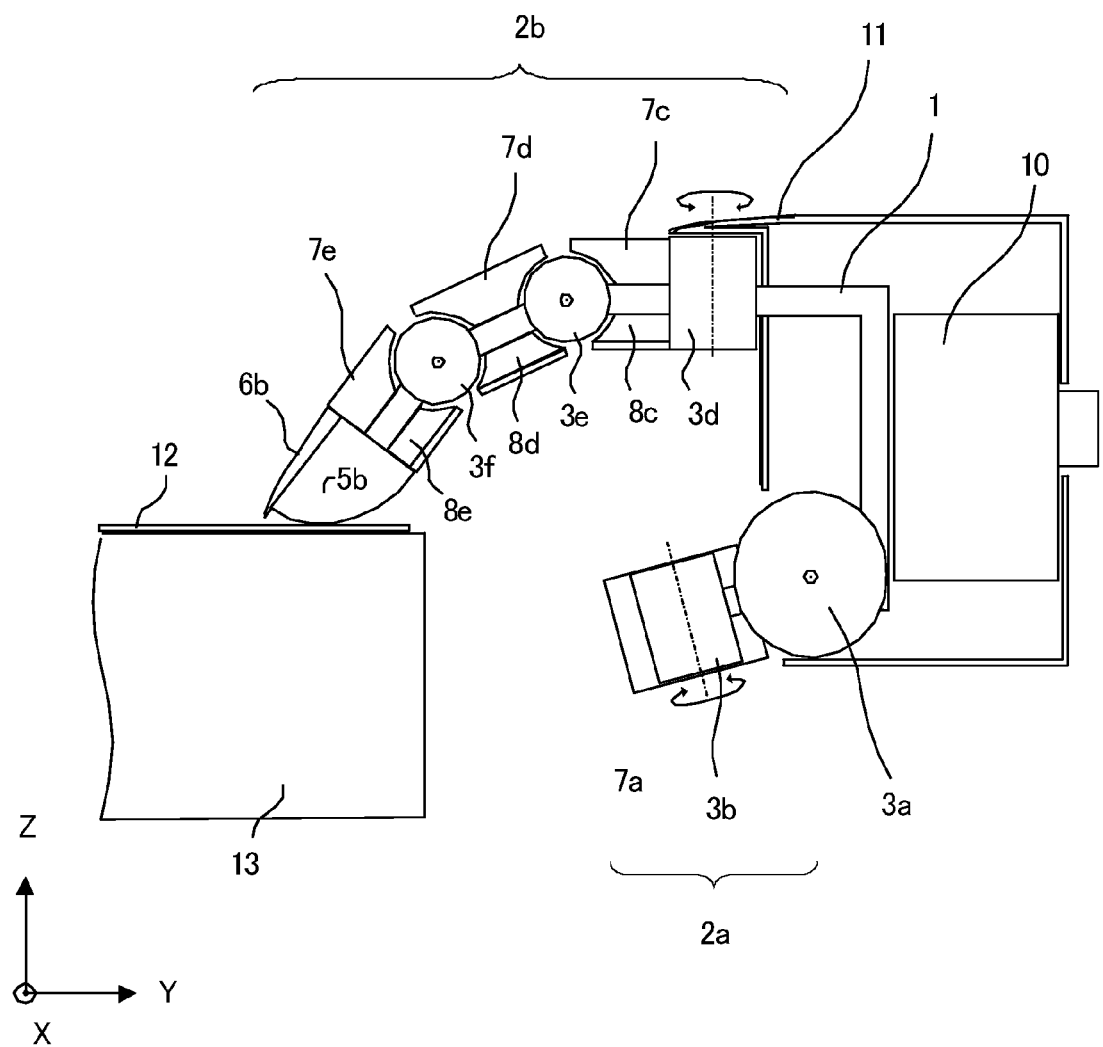
FIG. 4 is a side view showing a state in which the hand device of the present invention draws an object.

FIG. 4 is a side view of a state in which the hand device of the present embodiment draws an object 12, such as a sheet of paper, placed on a fixed body 13, such as a disk, into the positive direction of the Y-axis in FIG. 4. Moreover, FIG. 5 is a control flow chart of the finger control unit 10 at this time, and FIGS. 6A-6F are views showing a transition of the operation drawing the object 12. First, by rotating the finger drive unit 3b by almost 90°, the finger unit 2a is retracted into the X-axis direction in FIG. 6A lest the finger unit 2a should interfere with the fixed body 13 (Step S1). The finger control unit 10 drives the finger drive unit 3e and 3f to move the finger extension suppressing units 7c-7e and the finger bending suppressing units 8c-8e to take a posture by which any of the units 7c-7e and 8c-8e does not touch each other (Step S2). In this state, the not shown robot arm connected to the hand base unit 1 is moved into the negative direction of the Z-axis in FIG. 6A (Step S3, FIG. 6A). When the finger tip portion 5b touches the object 12 (FIG. 6B), an external force from the object 12 is transmitted to the finger drive units 3e and 3f through the links 4e and 4f, respectively. If the finger drive units 3e and 3f try to hold an instructed position against the external force, then the drive force generated by the finger drive units 3e and 3f becomes larger. The finger control unit 10 monitors whether the drive force of the finger drive units 3e and 3f exceeds a previously set predetermined value T1 or not (Step S4). When the drive force exceeds the predetermined value T1, the control unit 10 judges that the finger tip portion 5b touches the object 12 (Step S5). If the drive force does not exceed the predetermined value T1, then the control unit 10 examines whether the arm reaches the limit of the Z-axis or not (Step S6). If the drive force does not reach the predetermined value T1, then the processing returns to at Step S4 to continue to monitor the drive force continuously. If the arm reaches the limit of the Z-axis in the state of not touching the object 12, then the control unit 10 judges that an error has arisen, and informs the superior control apparatus of the occurrence of the error (Step S7). By the operation described above, the touching of the finger tip portion 5b to the object 12 can be detected without adding any detectors, such as a contact sensor, to the finger tip portion 5b.

The drive force can be obtained from a plurality of combinations of any of a torque instruction, a current instruction, and the value of current feedback to the motors here.

Figure 6A:
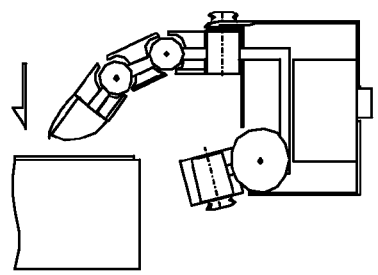
FIGS. 6A, 6B, 6C, 6D, 6E, and 6F are side views showing a transition of the operation of the hand device of the present invention at the time of drawing an object.
Figure 6B:
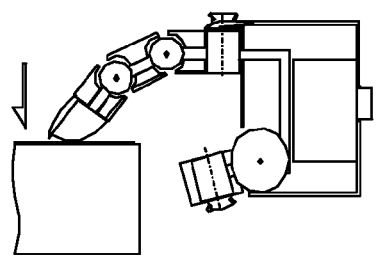
Figure 6C:
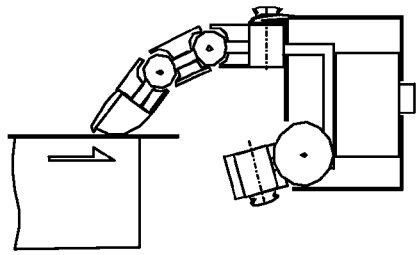
Figure 6D:
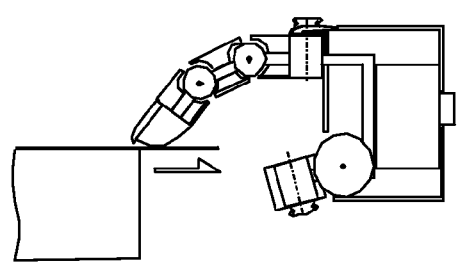

When the finger control unit 10 detects a touch of the finger tip portion 5b to the object 12 (Step S5), the control unit 10 stops the operation of the not shown robot arm into the negative direction of the Z-axis, and successively translates the arm into the positive direction of the Y-axis (Step S8, FIG. 6C). Since the finger tip portion 5b is pressed onto the object 12 by the drive force of the finger drive units 3e and 3f, also the object 12 is drawn in accordance with the operation of the robot arm. The finger control unit 10 monitors whether the drive force of the finger drive units 3e and 3f becomes less than the previously set predetermined value T1 or not (Step S9). When the drive force is less than the predetermined value T1, then the control unit judges that the finger unit 2b is separated from the object 12 and the fixed body 13 (Step S10, FIG. 6D). If the drive force is not less than the predetermined value T1, then the control unit 10 examines whether the arm reaches the limit of the Y-axis or not (Step S11). If the arm does not reach the limit, then the control unit 10 continuously returns the processing to Step S9 to continue to monitor the drive force. If the arm reaches the limit of the Y-axis in the state in which the finger unit 2b is not separated from the object 12 and the fixed body 13, then the control unit 10 judges that an error has arisen, and informs the superior control apparatus of the occurrence of the error (Step S12).

Figure 6E:
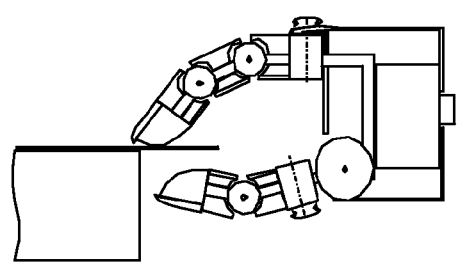
Figure 6F:
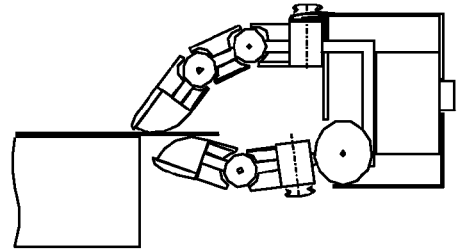

When the finger control unit 10 detects the separation of the finger unit 2b from the object 12 (Step S5), then the control unit 10 stops the operation of the not shown robot arm into the positive direction of the Y-axis (Step S13), and successively rotates the finger drive unit 3b by almost −90° to move the finger unit 2a to a grasp preparation posture (Step S14, FIG. 6E). The control unit 10 continuously makes the finger units 2a and 2b grasp the object 12 by the driving of the finger drive unit 3a (Step S15, FIG. 6F).

If a further external force added to the drive force to exceed the upper limit T2 of the finger drive units 3e and 3f in the state in which the drive force exceeds the predetermined value T1 and the touch of the finger tip portion 5b is detected, the finger drive units 3e and 3f are passively displaced in conformity with the external force as described above. Thereby the force given to the external environment by the hand device can be limited. Because the finger control unit 10 can set the upper limit T2 of the drive force on the basis of the information of the object 12, such as the outside dimensions thereof and the weight thereof, which information has been obtained by the superior control apparatus in advance with image recognition and detection means, such as the identification tag, the strength of the force, that is, the softness of the finger units 2a and 2b can be arbitrarily adjusted. For example, by setting the upper limit of the drive force to be lower (softer) before the touch thereof to the object 12, it becomes possible to escape the external force, which the objects 12 receives at the time of the touch. Consequently, the breakages of the finger drive units 3a-3f can be prevented, and the durability of the finger drive units 3a-3f can be improved. On the other hand, by setting the upper limit of the drive force to be higher (harder) after the touch to the object 12, it becomes possible to output the torque necessary for grasping and realize a stable and sure gasping.

In order to teach the operations of the finger drive units 3a-3f of the hand device as described above, the finger control unit 10 receives the information of the teaching mode from the superior control apparatus, and the finger control unit 10 sets the upper limit of the drive force to be low at the time of teaching the motion trajectory. Thereby, the so-called direct teaching, in which the links 4a-4f are directly moved by applying a force into a direction in which a teacher wants to move the finger units 2a and 2b by grasping a part of the links 4a-4f, and the angles, the angular velocities, and the angular accelerations of the links 4a-4f during the movement of the links 4a-4f are stored as time series information, can be performed at the time of teaching, and more intuitive teaching manipulation can be performed. Moreover, at the time of reproduction, the finger control unit 10 receives the information of the operation mode from the superior control apparatus, and the finger control unit 10 sets the upper limit of the drive force to be high. The finger control unit 10 outputs the time series information of stored angles, angular velocities, and angular accelerations as instruction values, and thereby the trajectories which have been taught can be reproduced with high accuracy.

As the method of detecting a touch to the object 12, the method of judging the touch on the basis of whether the deviation between the target angle of the finger drive units 3e and 3f and the present angle thereof reaches a predetermined angle or not can be considered in addition to the method of judging the touch on the basis of whether the drive force exceeds the upper limit value or not. The finger control unit 10 can detects the touch to the object 12 by whether the conditions of both of the drive force and the deviation are satisfied or not, whether the drive force exceeds the upper limit value or not, or whether the deviation reaches the predetermined value or not. According to the present technique, the existence of the touch can be judged accurately with position detectors provided in the finger drive units 3a-3f.

Furthermore, if absolute position detectors (absolute encoders) are not mounted on the finger drive units 3a-3f, then the so-called origin seeking operation for identifying the absolute positions of the finger drive units 3a-3f becomes necessary. The initial angle of a finger drive unit can be identified by driving the finger drive unit at the initial setting time into the extension direction to actuate the finger drive unit until the adjacent extension suppressing units touch each other and the drive force generated by the finger drive unit reaches a predetermined value. Moreover, if the finger drive unit is driven into the bending direction, similar advantages can be obtained.

Incidentally, the arrangement configuration of the finger drive units 3b-3f shown in FIG. 1 is an example to the last, and it is apparent that the advantages of the present invention can be obtained similarly also by the other shaft arrangement configurations, such as the configuration in which the rotation center of the finger drive unit 3d is the Y-axis and the configuration in which the finger drive units in the bending and extending directions have one more shaft besides the configuration of FIG. 1. Moreover, although the configuration including only the finger units 2a and 2b is adopted in the embodiment described above for simplification, it is desirable to include three or more finger units for stably grasping a body. For example, the configuration in which a finger unit 2c having the configuration similar to that of the finger unit 2b corresponding to a forefinger is arranged in almost parallel to the X-axis direction of FIG. 1 can be considered. Even in this case, it is apparent that the advantages described in the present embodiment can be similarly obtained. Moreover, even in the case of the other configurations of the finger units, similar advantages can be expected.

Moreover, not only in the hand device but also in the other link mechanisms including a robot arm device as an example, the present invention can be similarly developed.

Embodiment 2

Figure 7:
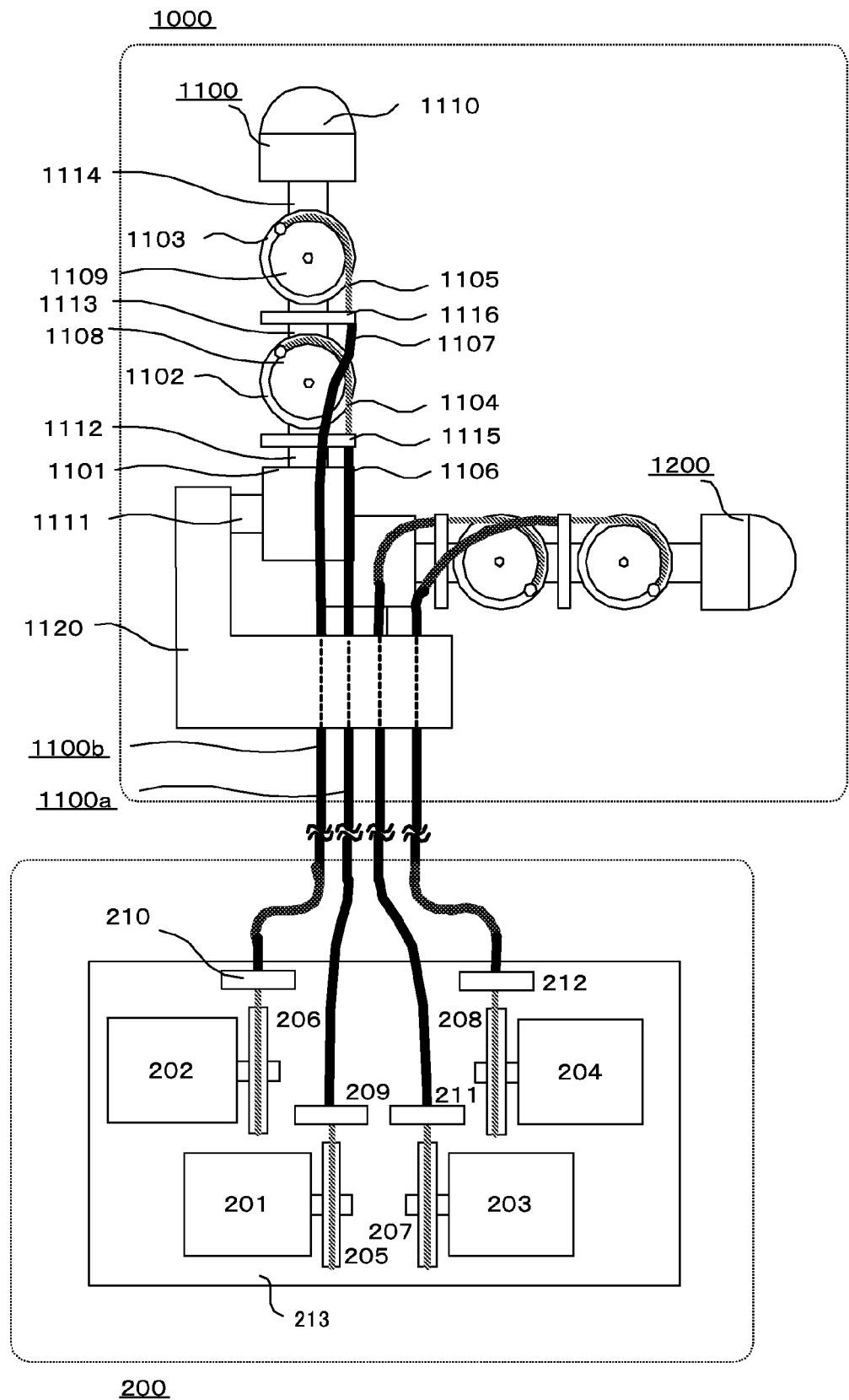
FIG. 7 is a configuration diagram of a multifingered robot hand device showing a second embodiment of the present invention.

FIG. 7 is a configuration diagram showing an example of the multifingered robot hand device of the present invention. In FIG. 7, a reference numeral 1000 denotes a multifingered hand unit of the multifingered robot hand device according to the present invention, and the multifingered hand unit 1000 includes fingers 1100 and 1200, each having three joints. Incidentally, although the case of two fingers and three joints per finger is shown in FIG. 7 for simplification, the number of the fingers and the number of joints are not limited to the above numbers.

The present invention is different from the embodiment 1 in that a pulley is provided to each figure drive unit provided in each joint, and that the pulley of each finger drive unit provided in each joint is driven by a large-sized actuator provided in a base unit to make it possible to perform wide operations from an accurate operation to the manipulation of a heavy load.

In FIG. 7, reference numerals 1101, 1102, and 1103 denotes finger drive units arranged in the joint portions of the finger 1100 to drive the joints accurately. The finger drive units 1101-1103 are each composed of a small-sized motor equipped with a highly accurate encoder, and the like. Each of the finger drive units 1101-1103 is connected to the next one with links 1112 and 1113. If the finger drive unit 1101 and the finger drive unit 1102 are exemplified, the main body of the finger drive unit 1101 is connected to the link 1112, and the link 1112 is connected to the rotation axis of the finger drive unit 1102.

A base unit 1120 is a member for attaching the multifingered hand unit 1000 to a not shown robot arm. A link 1111 is a member for fixing the finger drive unit 1101 to the base unit 1120, and a link 1114 is a member for connecting the rotation axis of the finger drive unit 1103 to a finger tip 1110. Reference numerals 1100*a* and 1100*b* denote power transmission units transmitting the power from an external power unit 200, which will be described later, to each of the joints, and the power transmission units 1100*a* and 1100*b* are composed of flexible tubes 1106 and 1107 and wires 1104 and 1105, respectively, in the present embodiment. The ends of the wires 1104 and 1105 are attached to pulleys 1108 and 1109, respectively, attached to the rotation axes of the finger drive units 1102 and 1103, respectively, so that the respective joints operate by pulling the wires 1104 and 1105, respectively. Moreover, the ends of the flexible tubes 1106 and 1107 are fixed to tube stops 1115 and 1116, respectively. The wires 1104 and 1105 pass through the inner parts of the flexible tubes 1106 and 1107, respectively, to be connected to the pulleys 1108 and 1109, respectively. The wires 1104 and 1105 are each wired in the state of holding certain tension without producing any looseness by passing through the flexible tubes 1106 and 1107, respectively.

Although the finger 1100 has been described above, the finger 1200 also has similar configuration.

In FIG. 7, the reference numeral 200 denotes the external power unit. The external power unit 200 includes motors 201, 202, 203, and 204 corresponding to each joint of the fingers 1100 and 1200, and pulleys 205, 206, 207, and 208 are attached to the shafts of the motors 201-204, respectively. The motors 201-204 used in the external power unit 200 are not used for accurate operations. Consequently, highly accurate encoders are not required, but the motors 201-204 are required to have a high output. The wires 1104 and 1105 of the power transmission units 1100*a* and 1100*b*, respectively, are wound around the pulleys 205 and 206, respectively, to be fixed thereon. The wires of the power transmission units corresponding to the joints of the finger 1200 are wound also on the pulleys 207 and 208 to be fixed thereon similarly. Reference numerals 209, 210, 211, and 212 denote tube stops fixed to a base unit 213, and the ends of the flexible tubes are fixed thereto.

When the wires of the motors 201-204 of the external power unit 200 are rotated in the directions of pulling the wires in the configuration described above, the corresponding joints of each of the fingers 1100 and 1200 bend.

Incidentally, although the finger drive unit 1101 is not connected to any external power sources in the present embodiment because the finger drive unit 1101 is not the joint of bending the finger 1100, a power source and a power transmission unit may be provided to be connected to the finger drive unit 1101 if necessary.

Although each of the power transmission units is composed of a flexible tube and a wire in the present embodiment, the configurations of the power transmission units are not limited to this one. The power transmission units having the other mechanisms may be used as long as the mechanisms can transmit power from the external power source to each joint.

Although the motors 201-204 are used as the power sources of the external power unit 200 in the present embodiment, power sources using pressures other than the motors may be used, and the power sources may be dispersed without arranging all the power sources on the base unit 213.

Figure 8:
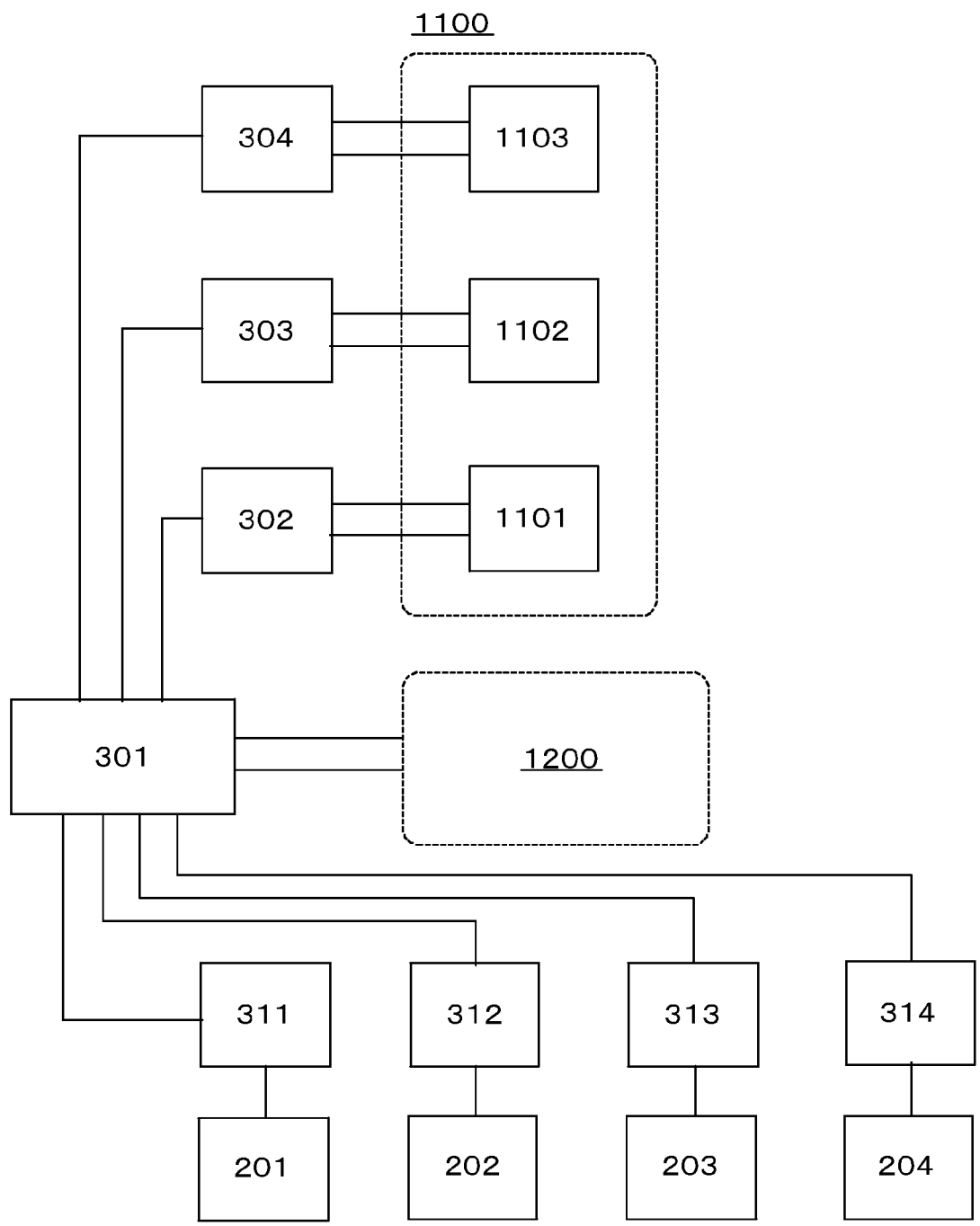
FIG. 8 is a diagram showing the electric configuration of the multifingered robot hand device showing the second embodiment of the present invention.

FIG. 8 is a diagram showing the electric configuration for driving the multifingered robot hand device of the present embodiment. In FIG. 8, a reference numeral 301 denotes a superior control apparatus outputting operation instructions to finger control units 302, 303, and 304 driving the finger drive units 1101, 1102, and 1103, respectively, in conformity with previously set programs, and the superior control apparatus 301 issues instructions to finger control units 311, 312, 313 and 314 driving the motors 201-204, respectively, of the external power unit 200. The finger control units 302, 303, and 304 drive the finger drive units 1101, 1102, and 1103, respectively, in conformity with the instructions from the superior control apparatus 301, and perform the controls of rotations and positions by using the information from encoders incorporated in the finger drive units 1101, 1102, and 1103.

Figure 9:
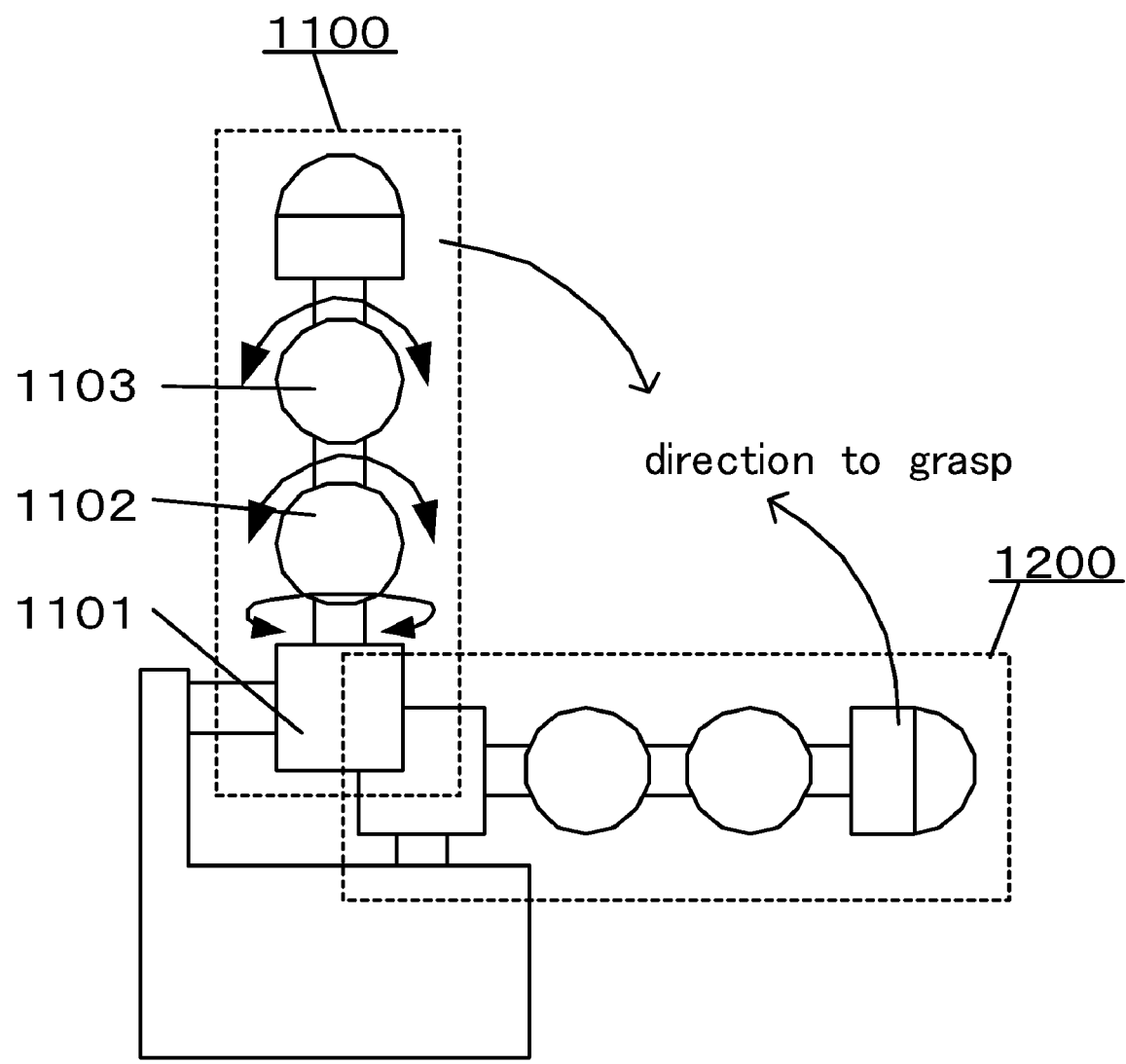
FIG. 9 is a view showing the operation directions of the multifingered robot hand device showing the second embodiment of the present invention.

FIG. 9 is a view showing operation directions of the multifingered robot hand device according to the present embodiment. The finger drive units at the roots of the fingers 1100 and 1200 (e.g. the finger drive unit 1101 in the finger 1100) are devices for rotating the whole fingers 1100 and 1200 as shown in FIG. 9. The other finger drive units (e.g., the finger drive units 1102 and 1103 in the finger 1100) are devices for bending the fingers 1100 and 1200. The grasping of a body by means of the multifingered robot hand device of the present embodiment is performed by bending the fingers 1100 and 1200 into the directions of approaching each other as shown in FIG. 9.

Next, the operation of the multifingered robot hand device will be described.

The superior control apparatus 301 obtains the information of the outside dimensions and weight of an object in advance by means of image recognition and detection means, such as an identification tag, similarly to the embodiment 1, and informs the finger control units 302-304 and 311-314 of the information. Thereby, the grasping method by which working is performed is selected.

In the case of performing precise and complicated work, each joint is actuated only by the finger drive units 1101, 1102, and 1103. At this time, the motors 201-204 of the external power unit 200 are not instructed by the superior control apparatus 301, and do not generate any drive forces. Consequently, the finger drive units 1101, 1102, 1103, . . . are allowed to operate freely. Thereby, the finger drive units 1101, 1102, 1103, . . . are not prevented in their operations by the motors 201-204 of the external power unit 200, and can operate in conformity with the instruction from the superior control apparatus 301. Consequently, the multifingered robot hand device can perform precise and complicated work. Moreover, as another method, it is also possible not to prevent the operations of the finger drive units 1101, 1102, 1103 by the following method. That is, when the superior control apparatus 301 transmits instructions to the finger control units 302, 303, and 304 to actuate the finger drive units 1101, 1102, and 1103, the superior control apparatus 301 obtains the shaft position of each of the finger drive units 1101, 1102, and 1103 from the finger control units 302, 303, and 304, respectively, and then the superior control apparatus 301 transmits instructions to the finger control units 311-314 so as to rotate the motors 201-204, respectively, to follow the obtained shaft positions.

Next, the case of grasping and conveying a heavy object with a multifingered robot hand device is exemplified to describe the operation in the case as to a case of requiring a strong grasping force.

First, similarly to the case of performing accurate work, the object is grasped using the finger drive units 1101, 1102, and 1103 in the state in which no power is generated by each of the motors 201-204 of the external power unit 200. If the object is conveyed in this state, the finger drive units 1101, 1102, and 1103 cannot hold the bending positions of the joints supporting the object weight, and the falling and the like of the object arise. Accordingly, after the completion of the grasping of the object with the finger drive units 1101, 1102, and 1103, the superior control apparatus 301 transmits instructions to the finger control units 311-314 to actuate the motors 201-204 so that the generated power is transmitted with the power transmission unit 1100a and 1100b and actuate each joint into the direction of grasping the object. The power of the motors 201-204 works as the grasping force of the multifingered robot hand device as described above, the heavy object can be conveyed without causing the falling of the work and the like.

Because a grasping force stronger than the one generated by the finger drive units 1101, 1102, and 1103 is generated when the power is generated by the motors 201-204, it is conceivable that each joint moves. In this case, the finger control units 302, 303, and 304 try to move the finger drive units 1101, 1102, and 1103 to return the joints to their original positions, but the directions are the one conflicting with the power generated by the motors 201-204. Consequently, there is the possibility of causing the lowering of the grasping force and the breakages of the actuators. Accordingly, after the superior control apparatus 301 has instructed the finger control units 311-314 to generate power with the motors 201-204, the superior control apparatus 301 instructs the finger control units 302, 303, and 304 to turn off their servo controls, and performs the switching of the power so as to grasp the object only with the power of the motors 201-204. Moreover, the superior control apparatus 301 can know how much the joints have been moved by the motors 201-204 through the finger control units 302, 303, and 304. Consequently, the superior control apparatus 301 can also use the force generated by both the actuators and the external power unit 200 as the grasping force by transmitting the instructions so as to follow the operations of the joints.

After the completion of the conveyance, the superior control apparatus 301 instructs the finger control units 311-314 to actuate the joints into the directions to release the object and then the superior control apparatus 301 releases the object. After the releasing of the object, the superior control apparatus 301 instructs the finger control units 302, 303, and 304 to turn on their servo controls.

As described above, by using the power generated by the external power unit 200, it becomes possible to perform both of precise and complicated work and work requiring a strong grasping force by means of one multifingered robot hand device.

Embodiment 3

Figure 10:
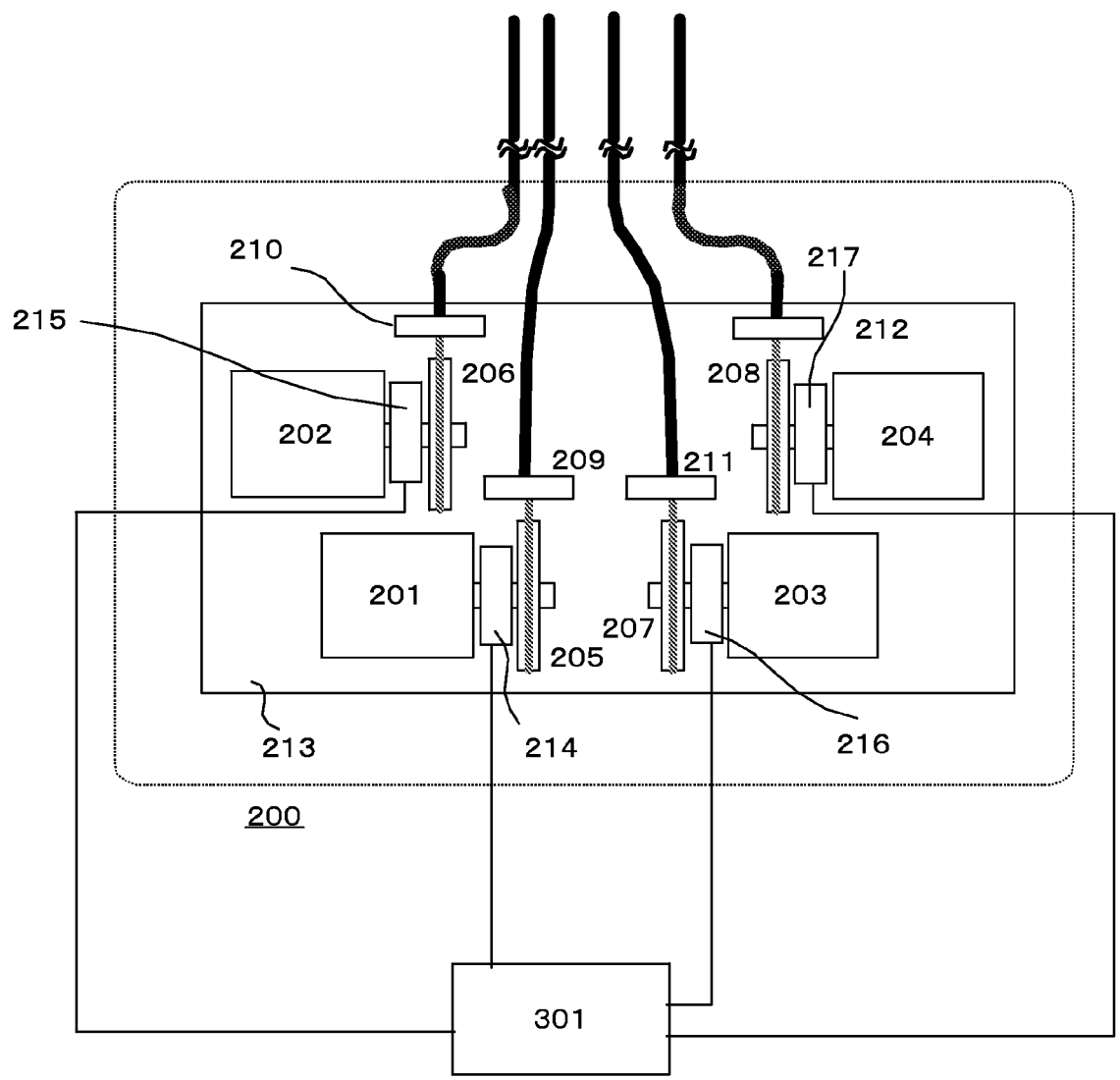
FIG. 10 is a view showing the configuration of an external power unit of a third embodiment of the present invention.

FIG. 10 is a view showing the configuration of the external power unit 200 of a third embodiment of the present invention. The reference numerals 201-204 denote the same components as those of the second embodiment. Reference numerals 214-217 denote power cutting units, which perform the connection and cutting of the power transmission between the motors 201-204 and pulleys 205-208 on the basis of the instructions from the superior control apparatus 301. The power cutting units 214-217 is each composed of, for example, an electromagnetic clutch or an electromagnetic brake. That is, each of the power cutting units 214-217 has a facing structure, one surface of which is made of a ferromagnetic material or a soft magnetic material, the other surface of which is provided with an electromagnet on the opposed surface. The configurations of the clutch mechanism and the brake mechanism can be obtained by means of an attracting force generated by the electrification to the electromagnet.

In the case of using the external power unit 200 having the configuration described above, the motors 201-204, which are power sources, are separated from the pulleys 205-208, respectively, by means of the power cutting units 214-217, respectively, when precise and complicated work is performed by using the finger drive units 1101, 1102, 1103, ..., and consequently the motors 201-204 become not the loads of the finger drive units 1101, 1102, and 1103. Therefore, the operation speed and the accuracy of the multifingered hand unit 1000 can be improved.

Moreover, although the power cutting units 214-217 are arranged in the external power unit 200 in the present embodiment, the power cutting units 214-217 may be arranged between the shafts of the pulleys 1108 and 1109 and the finger drive units 1102 and 1103 of the multifingered hand unit 1000 to enable the separation of the power sources.

By the power cutting units 214-217, the large power of the drive units 1101, 1102, and 1103 arranged on the base unit 1120 is not transmitted, and thereby precise and complicated work can be easily performed. Thus, no excessive power operates on the drive unit arranged at each joint, which enables the prevention of the occurrence of breakages.

Embodiment 4

Figure 11A:
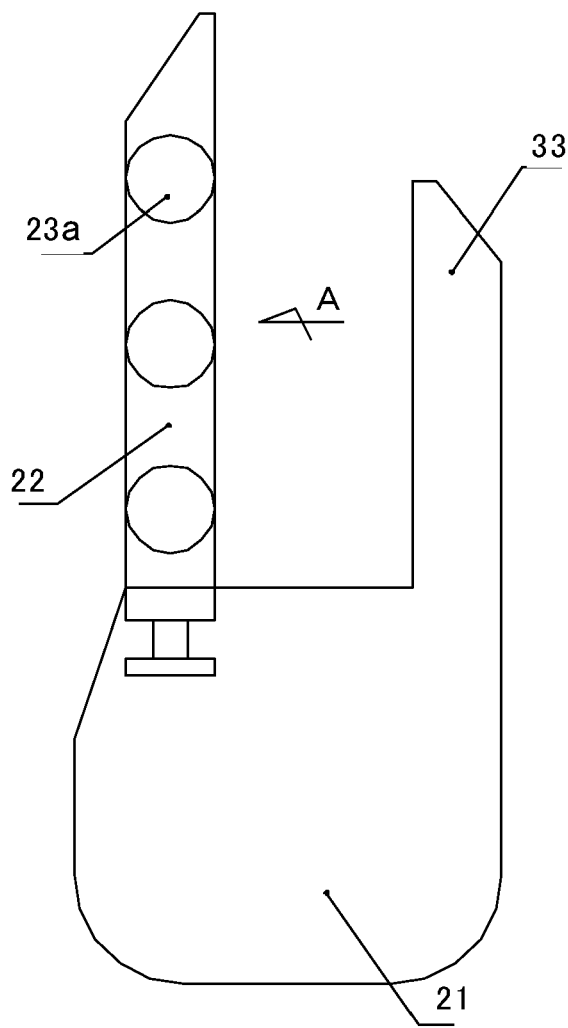
FIGS. 11A and 11B are a side view and a view in the direction of an arrow in the case of a hand device of the present invention having an integrating mechanism.
Figure 11B:
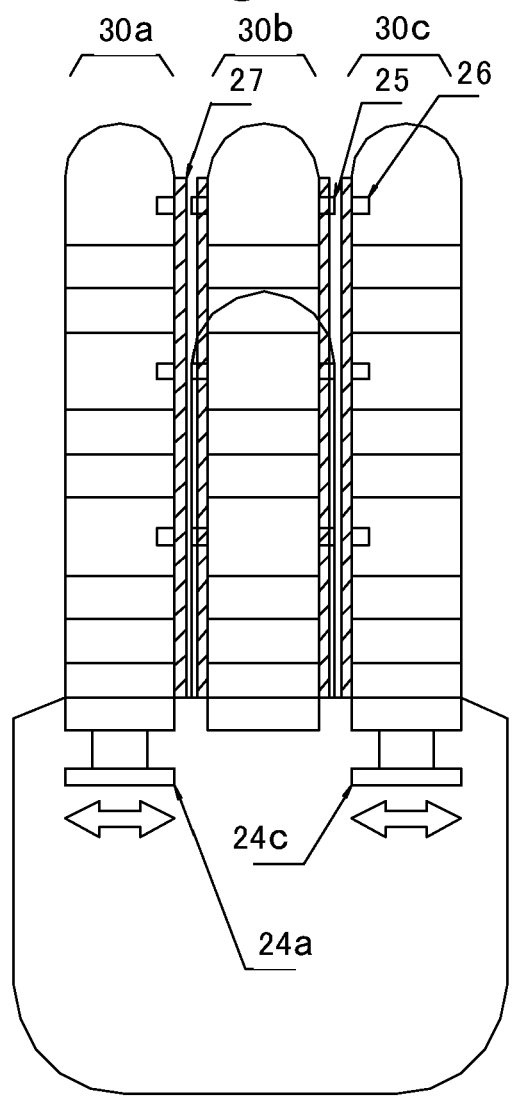

FIGS. 11A and 11B are a side view and a view in the direction of an arrow, respectively, showing the case where the hand device of the present invention includes an integrating mechanism for integrating a plurality of fingers. In FIGS. 11A and 11B, a reference numeral 21 denotes a hand base unit, reference numerals 30a, 30b, 30c, and 33 denote finger units arranged on the hand base unit 21. The finger unit 33 corresponds to a thumb of a human being, and the finger units 30a, 30b, and 30c corresponds to the other fingers. The finger unit 33 and the finger units 30a, 30b, and 30c are almost opposed to each other. The finger units 30a, 30b, and 30c are configured to join a finger drive unit 23a with a link 22. Direct acting mechanisms 24a and 24c, each made of a ball screw or a voice coil motor, are provided at the base portion of the finger units 30a and 30c, respectively. The finger units 30a and 30c are configured to be able to move into the arrow directions in FIG. 11B with not shown drive units. A reference numeral 25 denotes a convex part provided to each link of the finger unit 30b, and a reference numeral 26 denotes a concave part provided to each link of the finger units 30a and 30c. Moreover, a reference numeral 27 denotes an elastic member retractable by a pressing force.

The finger units 30a and 30c are moved into the directions of approaching to the finger unit 30b with the direct acting mechanisms 24a and 24c, and convex parts 25 are fitted to the concave parts 26. Thereby, three finger units 30a, 30b, and 30c are almost integrated. There are the next two methods as the operation method of the finger units 30a, 30b, and 30c at the time of the integration. A first method is driving all of the three finger units 30a, 30b, and 30c to perform synchronous actuation by a cooperative control. That is, a not shown control apparatus carries out an operation so as to control the angle and grasping force of each of the finger units 30a, 30b, and 30c on the basis of the signals from not shown angle detectors arranged to the finger units 30a, 30b, and 30c, and supplies drive currents or drive voltages to the actuators. Moreover, a second method is driving only one finger unit and making the other finger units follow the movement of the first finger unit. For example, the finger unit 30b is actuated by the actuator thereof to enable the grasping. For that matter, the drive capacities of the drive unit of each of the finger units 30a, 30b, and 30c are not necessarily the same. Drive units having different drive capacities may be mixed, and a drive unit to be used may be changed according to the object to be grasped.

Figure 13:
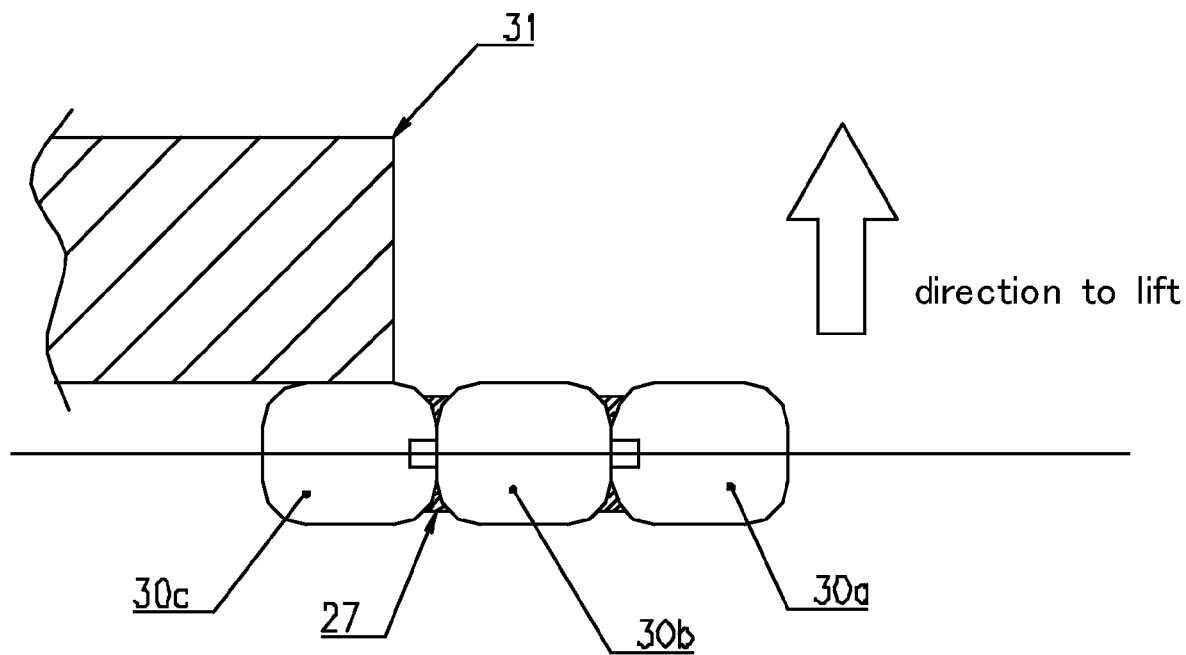
FIG. 13 is a sectional view showing a working state of the hand device of the present invention.

FIG. 12 is a view showing the state in which a hand device of the present invention tries to lift an object 31 having a projection. As shown in FIG. 12, the projection portion of the object 31 abuts against only the finger unit 30b. If each finger unit exists alone, then the entire load of the object 31 is loaded on the finger unit 30b, and the entire load of the object 31 must be supported by the finger unit 30b alone. However, in the case where the finger units 30a, 30b, and 30c are integrated with the integrating mechanism as the hand device of the present invention, the load loaded on the finger unit 30b is dispersed also onto the finger units 30a and 30c, and consequently the load loaded on one finger unit is reduced. As described above, by integrating the plurality of finger units 30a, 30b, and 30c, the load loaded on one of the finger units 30a, 30b, and 30c is dispersed onto the other ones, and overload errors of the drive units driving the finger units 30a, 30b, and 30c and the breakages of the finger units 30a, 30b, and 30c can be prevented. Thereby, more stabilized grasping operation can be performed. FIG. 13 is a view showing the state in which the hand device of the present invention tries to lift an end of the object 31 only with the finger unit 30c. Also in FIG. 13, the load loaded on the finger unit 30c is dispersed onto the other finger units 30a and 30b, and the same advantages as those of the case of FIG. 12 can be obtained.

FIG. 14 is a view showing the state in which the hand device of the present invention tries to lift the object 31 into the direction perpendicular to the lengthwise direction of the finger units 30a, 30b, and 30c. In the case where the finger units 30a, 30b, and 30c are integrated as shown in FIG. 14, the rigidity of the finger units 30a, 30b, and 30c becomes higher in comparison with the case in which each of the finger units 30a, 30b, and 30c is arranged singly, and a heavier object can be stably grasped when the object 31 is lifted in the direction shown in FIG. 14. In particular, if the finger units each having a drive shaft rotatable into the same direction as a load direction as a rotation drive unit 23b in FIG. 14 are integrated, the integration is especially effective.

Although the description of the present invention has been mainly given to the cases of industrial robots, the present invention may be applied to any robot having a hand unit attached to the end of the arm unit of the robot. Consequently, the application of the present invention is not limited to the industrial robots, but the present invention can be applied to humanoid robots and the like.

What is claimed as new and is desired to be secured by Letters Patent of the United States is:

1. A robot comprising:
   a base unit;
   at least two link mechanisms arranged on the base unit;
   drive units capable of bending and extending the link mechanisms, respectively, at least one of the drive units having a maximum drive force output larger than those of the other drive units, the other drive units being passively displaced by an external force larger than their own drive forces;
   extension suppressing units suppressing displacement of the other drive units in directions of their extensions at predetermined positions; and
   a control unit controlling the drive units.

2. The robot according to claim 1, wherein the control unit controlling the drive units is provided in the base unit.

3. The robot according to claim 1, wherein the extension suppressing units are also external appearance covers of the link mechanisms.

4. The robot according to claim 1, wherein the drive unit having the larger maximum drive force output is arranged at a joint nearest to the base unit.

5. The robot according to claim 1, wherein the link mechanisms are arranged to be almost opposed to one another.

6. The robot according to claim 1, wherein a rotation axis of the at least one drive unit arranged to the link mechanisms is arranged to be perpendicular to rotation axes of the other drive units.

7. The robot according to claim 1, wherein the control unit controls the drive units lest adjacent ones of the extension suppressing units should touch each other when a manipulation object is a small-sized light load, and controls the drive units so that the adjacent ones of the extension suppressing units touch each other when the manipulation object is a large-sized heavy load.

8. The robot according to claim 7, wherein the control unit judges whether the robot touches the manipulation object or not based on whether the drive forces generated by the drive units reach a predetermined value or not.

9. The robot according to claim 7, wherein the control unit can change an upper limit value of the drive forces generated by the drive units, and sets the upper limit value to be lower before the robot touches the manipulation object and sets the upper limit value to be higher after the robot touches the manipulation object.

10. The robot according to claim 7, wherein the control unit sets an upper limit value of the drive forces generated by the drive units to be lower when motion trajectories of the drive units are directly taught and sets the upper limit value to be higher when the motion trajectories are reproduced.

11. The robot according to claim 7, wherein the control unit judges whether the robot touches the manipulation object or not based on at least either of a condition that the drive forces generated by the drive units exceed an upper limit value of the drive forces and a condition that deviations of target angles of the drive units from their present angles reach a predetermined value.

12. The robot according to claim 7, wherein the control unit drives the drive units into an extension direction at an initial setting time and actuates the drive units until the drive forces of the drive units reach a predetermined value by a touch of the adjacent ones of the extension suppressing units, and thereby the control unit identifies initial angles of the drive units.

13. The robot according to claim 7, wherein the control unit drives the drive units into bending directions at an initial setting time and actuates the drive units until the drive forces generated by the drive units reach a predetermined value, and thereby the control unit identifies initial angles of the drive units.

14. A robot comprising:

a base unit;

at least two link mechanisms arranged on the base unit;

drive units capable of bending and extending the link mechanisms, respectively, the drive units arranged on the base unit having maximum drive force outputs larger than those of the other drive units capable of bending and extending the link mechanisms, the drive units arranged on the base unit transmitting power to the link mechanisms with a power transmitting mechanism; and a control unit controlling the drive units.

15. The robot according to claim 14, wherein a superior control apparatus outputting an instruction to the control unit includes a switching unit actuating at least one drive unit among the drive units actuating the link mechanisms and the drive units arranged on the base unit.

16. The robot according to claim 14, wherein one sides of wires of the power transmitting mechanism are seized by pulleys of the drive units arranged on the base unit, and the other side of the wires are seized by the pulleys formed on the drive units actuating the link mechanisms to enable to be bent and extended, the wires passing through inner parts of flexible tubes.

17. The robot according to claim 14, wherein the drive units actuating the link mechanisms to be enabled to be bent and extended use motors equipped with more accurate encoders than those of motors used in the drive units arranged on the base unit.

18. The robot according to claim 14, further comprising power cutting units switching performance of power transmission of the drive units arranged on the base unit between motors and pulleys.

19. The robot according to claim 18, wherein the power cutting units operate by magnetic action and switch the power transmission by controlling electrification states.

20. The robot according to claim 18, wherein each of the power cutting units forms a facing structure, arranges an electromagnet on one facing surface, and arranges either or both of a ferromagnetic body and a soft magnetic body on the other facing surface.

* * * * *